United States Patent [19]

Ellis et al.

[11] Patent Number: 4,648,108
[45] Date of Patent: Mar. 3, 1987

[54] CONFERENCE CIRCUITS AND METHODS OF OPERATING THEM

[75] Inventors: John G. Ellis; Bruce L. Townsend, both of Nepean; Leo Strawczynski, Ottawa, all of Canada

[73] Assignee: Northern Telecom Limited, Montreal, Canada

[21] Appl. No.: 787,935

[22] Filed: Oct. 16, 1985

[51] Int. Cl.[4] .............................................. H04M 3/56
[52] U.S. Cl. ...................................... 379/202; 370/62
[58] Field of Search ......... 179/18 BC; 370/62, 18 BG

[56] References Cited

U.S. PATENT DOCUMENTS 4,550,224 10/1985 Winchell ........................ 179/18 BC Primary Examiner—James L. Dwyer
Attorney, Agent, or Firm—Thomas Adams

[57] ABSTRACT

A conference circuit has a plurality of ports for a corresponding plurality of conferees. Associated with the ports is a control circuit which determines whether a conferee is active, i.e. talking, or dormant, i.e. listening. The circuit applies gain to the "active" signals and attenuates the "dormant" signals. When a listener starts to talk, the circuit switches his port to the "active" mode. Difficulties arise in determining when a listener becomes active, due to noise and echo with the speech signal. They are mitigated by comparing the signal from the port with an echo signal estimate derived from the echo return loss for the transmission path associated with the port. The arrangement takes account of differing echo levels for different transmission paths.

20 Claims, 4 Drawing Figures

FIG. I

CONFERENCE CIRCUITS AND METHODS OF OPERATING THEM

The invention relates to conference circuits, and methods, particularly in which multiple users or parties are interconnected simultaneously over a telecommunications network.

The ubiquitous telephone system, and like telecommunications networks, are designed to connect parties together on a one-to-one basis. Measures are included to prevent multiple parties sharing the same line simultaneously since this constitutes a fault condition.

In order to connect multiple parties together simultaneously, conference circuits usually employ a so-called bridge which may be located at a node such as a central office. The various conferees are connected via the normal telephone lines to the bridge where they are connected together.

In this specification, the term SEND-IN will be used to refer to a speech signal arriving at a conference circuit port from a conferee. The term RECEIVE-OUT is used for a signal leaving the port towards the conferee.

The normal "one-to-one" telecommunications system is designed to keep noise and echo within tolerable limits. However, it is not designed to do so when multiple parties are interconnected. When several parties are interconnected, noise levels add together. At the same time stability margins are eroded because more user circuits are connected in parallel. With only two parties interconnected transhybrid loss is sufficient to ensure stability in the loop formed between the hybrids of the respective parties. Connecting more parties—and hence parallel loops—increases the likelihood of feedback signals being in phase. This may reduce the stability margin to such an extent that instability will occur, producing a typical "feedback howl".

In early systems, such instability was prevented by attenuating the signals received from all parties. More recently, however, it has been preferred to deal with both instability and additive noise by selecting a limited number of "active" speakers and attenuating the signals received from the remaining, "dormant" listeners. When a "dormant" party wishes to break into the conversation, the conference circuit must recognise as much, and substitute him for one of the "active" parties. Difficulties arise in deciding whether a party is dormant or active because of the presence of echo and noise with the incoming speech signal.

In addition, satisfactory operation of such a conference circuit requires adequate and uniform listening levels. Subjectively, conferees find a difference of greater than 12 dB between different parties' sound levels to be unacceptable.

Sound levels for different parties vary because some people speak louder than others and also because some parties are connected by longer transmission paths than others. The location of the conference bridge relative to the participants may exacerbate attenuation differences since more network links may be involved.

Differences in attenuation can be compensated by selective amplification of the incoming signals. The design of such a system is complicated by the need to avoid applying gain to noise and echoes within the system. Thus, "break-in" performance and satisfactory application of automatic gain control are a function of how well the bridge control can discriminate between the echoed version of the near-end speech signal leaving the bridge and a far-end speaker attempting to break in, and between far-end speaker and background noise.

The primary requirement of the echo discriminator is that it improves the ability to sense the presence of a far-end talker whether or not an echo signal from the outgoing channel is present. This is necessary to facilitate easy break-in for a conferee while another speaker is active. The decision that a far-end speaker is active should neither be made too freely nor too conservatively, since many false break-ins due to an "easy" criterion would be annoying for all listeners, and an overly stringent criterion would result in break-in difficulty and probable clipping of speech.

It has been proposed to mitigate this problem, and facilitate discrimination between far-end speech and near-end speech echo, by means of echo cancellers. However, they are presently too expensive to use in all situations.

According to one aspect of the present invention, a conference circuit comprises:

(i) a plurality of ports, each for connection by a respective transmission path to one of a plurality of conferees, each port being arranged to pass RECEIVE-OUT speech signals from the conference circuit to the associated conferee and to pass SEND-IN speech signals from the conferee to the conference circuit;

(ii) means for combining SEND-IN speech signals from at least two of said ports and applying the combination to at least one of the remaining ports;

(iii) measuring means responsive to said RECEIVE-OUT and SEND-IN signals for deriving directly or indirectly an echo return loss estimate for the particular transmission path associated with that port;

(iv) detection means responsive to said echo return loss estimate and to said RECEIVE-OUT and SEND-IN signals for providing a signal indicating that the conferee associated with that port is speaking; and (v) control means responsive to the output of said detection means for initiating said combining means to combine the SEND-IN signals from two or more conferees.

An advantage of this arrangement is that the decision as to whether or not a speaker is "active" takes account of the echo return loss of the individual transmission path associated with that speaker. Different echo return loss estimates will be produced when different transmission paths are coupled to a given port.

Preferably the measuring means derives the ERL estimate using signals derived from or representing the SEND-IN and RECEIVE-OUT signals. The derived signals may be obtained by averaging the SEND-IN and RECEIVE-OUT signals over a predetermined time period, for example 4 milliseconds, and converting to a logarithmic base. (For convenience such average, logarithmic signals will be referred to as SEND-IN-AV and RECEIVE-OUT-AV.) Then the echo return loss may be estimated directly by comparing the SEND-IN-AV signal with the RECEIVE-OUT-AV signal. Preferably the comparison is with the minimum RECEIVE-OUT-AV signal derived over a suitable period, for example 32 milliseconds. Use of this minimum value ensures that the worst case is covered.

The measuring means may then comprise means for adapting the echo return loss estimate in dependence upon whether or not the difference between the SEND-IN-AV and RECEIVE-OUT-AV signals is greater than, equal to, or less than a previous estimate of echo return loss stored in suitable storage means.

The detection means may comprise means for subtracting the echo return loss estimate from the signal representing the RECEIVE-OUT-AV signal (preferably a maximum value derived over a predetermined period, for example 32 milliseconds) and means for comparing the resultant with the signal derived from the SEND-IN-AV signal to provide the determination of whether the conferee is active or dormant. The use of the maximum value of RECEIVE-OUT-AV ensures that the worst case is covered.

In addition to responding to the detection means, as previously mentioned, the control means may also be responsive to a noise measuring circuit which compares the SEND-IN-AV signal with a noise estimate for the transmission path to determine whether the SEND-IN-AV signal exceeds a predetermined noise level and is thus speech.

According to another aspect the invention comprises a method of operating a conference circuit of the first aspect.

An embodiment of the invention will now be described by way of example only and with reference to the accompanying drawings, in which.

Figure 1:
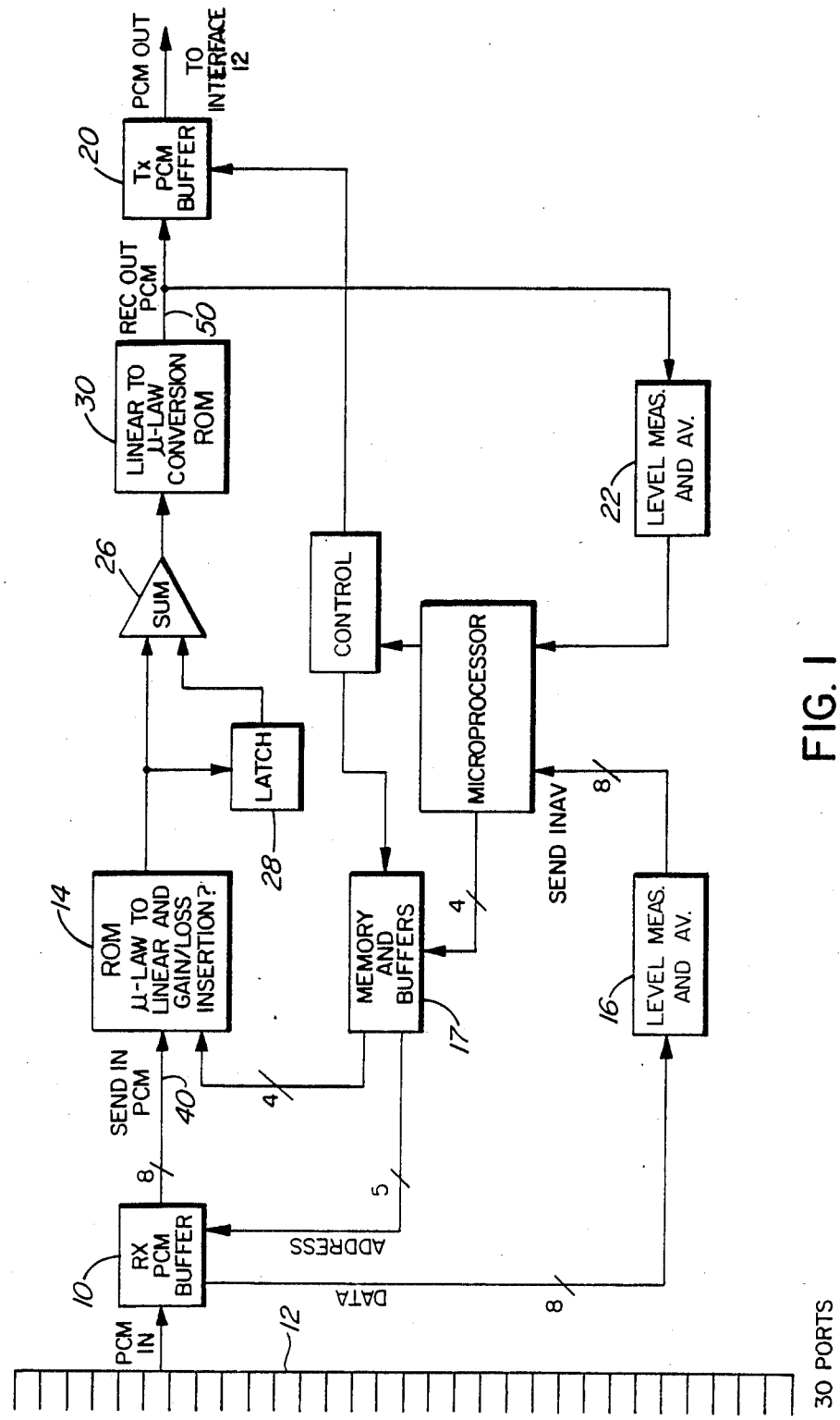
FIG. 1 is a block schematic representation of a conference circuit.

Referring to FIG. 1, a conference circuit comprises a receiver buffer 10 for receiving a pulse code modulated (PCM) signal from a virtual interface 12 which represents thirty ports, one for each conferee. The PCM signal comprises thirty 64 kBit/sec time-divison multiplexed voice channels, i.e. one for each potential conferee. Each 8-bit, 125 microsecond sample of the PCM signal is applied to a read-only memory (ROM) 14 and to measuring means comprising level measuring means 16 and a microprocessor 18. The level measuring means 16 produces a signal representing the logarithm of the linearized SEND-IN signal for each port or conferee averaged over a 4 millisecond period. This averaged signal is applied to microprocessor 18 together with a corresponding average linearized signal derived from the RECEIVE-OUT signal for the same port, taken from the input to a transmitter buffer 20, by means of a second level measuring means 22.

Briefly, the microprocessor 18 performs a minimum sort on the current one and past 8 RECEIVE-OUT-AV averages. This value is then compared with SEND-IN-AV to give an estimate of the echo return loss for the transmission path associated with that individual port. The echo return loss estimate is then used to determine if a port is active. If the averaged SEND-IN-AV signal is greater than the maximum RECEIVE-OUT-AV signal (over 9 successive 4 millisecond periods) minus the echo return loss, the microprocessor 18 signals that the port is active, i.e. there is a conferee speaking on the corresponding line.

For each channel of the PCM signal, and hence each "listener" port, the microprocessor 18 generates two 5-bit words, which constitute, respectively, the addresses in receiver buffer 10 of the two PCM channels which are to be directed to that listener port. The microprocessor 18 also generates for each address a gain signal, a 4-bit word, which causes the gain/loss insertion means 14 to apply the appropriate gain or attenuation. Thus, the memory and buffer means 17 can be visualized as a table listing, for each port, the two other ports to which it is listening.

The microprocessor 18 updates this table, i.e. memory 17, relatively infrequently, i.e. every 4 milliseconds. The corresponding control of the PCM samples, however, is carried out at the normal PCM sampling rate under the control of hardware control means 19. The microprocessor 18 has internal memory corresponding to that in memory and buffer 17. During each 4 millisecond period, the microprocessor updates its own memory table to confirm which ports are active and hence which signals are to be combined. At the end of the 4 millisecond period, the microprocessor 18 signals the control means 19 which initiates transfer of the contents of the microprocessor's memory table to memory and buffer 17.

Memory and buffer 17 is accessed for each outgoing PCM sample under the control of control means 19. Thus, the corresponding two 5-bit address words are applied to receive buffer 10 to access the two corresponding incoming PCM samples which are to be processed and then combined as the outgoing sample.

Each 8-bit PCM sample from the receive buffer 10 combined with the 4-bit gain signal from memory and buffer means 17 forms a 12-bit address for ROM 14. For each outgoing PCM sample, a pair of 14-bit words (including sign bits) are outputted from the ROM 14. Each such word has been converted from $\mu$-law to linear and its amplitude adjusted to equalize its amplitude with those of other active conferees and to provide an adequate listening level. The first 14-bit word is applied to a latch 28. The output of the latch 28, is applied to one input of summer 26. The second word is applied directly to the other input of summer 26. The output of summer 26, which is the combination of the two words, is converted from linear back to $\mu$-law by conversion ROM 30. The output of the ROM 30 is the RECEIVE-OUT-AV PCM signal for application to transmitter buffer 20 which outputs the appropriate PCM sample to the ports assigned to the other conferees.

Thus the purpose of latch 28, working in conjunction with summer 26, is to combine two incoming PCM samples for transmission together. If the outgoing PCM sample is destined for a dormant or listener port, the signals from two conferees deemed by the microprocessor 18 to be active (talkers) are combined. This applies to all conferees deemed by the microprocessor 18 to be dormant (listeners). Hence, the listeners hear both of the talkers. The "active" parties or talkers are arranged to hear only each other. Consequently, only one of the samples summed by summing means 26 is from an active port. The other is provided by a dummy idle port (not shown) selected by the microprocessor 18. Use of a dummy port in this way simplifies the combining of the signals. The dummy port or channel may be provided as a location in the receive buffer ROM 10 which has a PCM value and is addressed in the same way as the other thirty ports.

In order to break into the conversation, a listener must supplant one of the active channels or talkers. The microprocessor 18 monitors the listeners' ports for the presence of speech—as distinct from echo or noise——and, if speech is detected, "flags" that port as "active". The basis upon which the decision is made will now be described with reference to FIGS. 2, 3 and 4.

Figure 2:
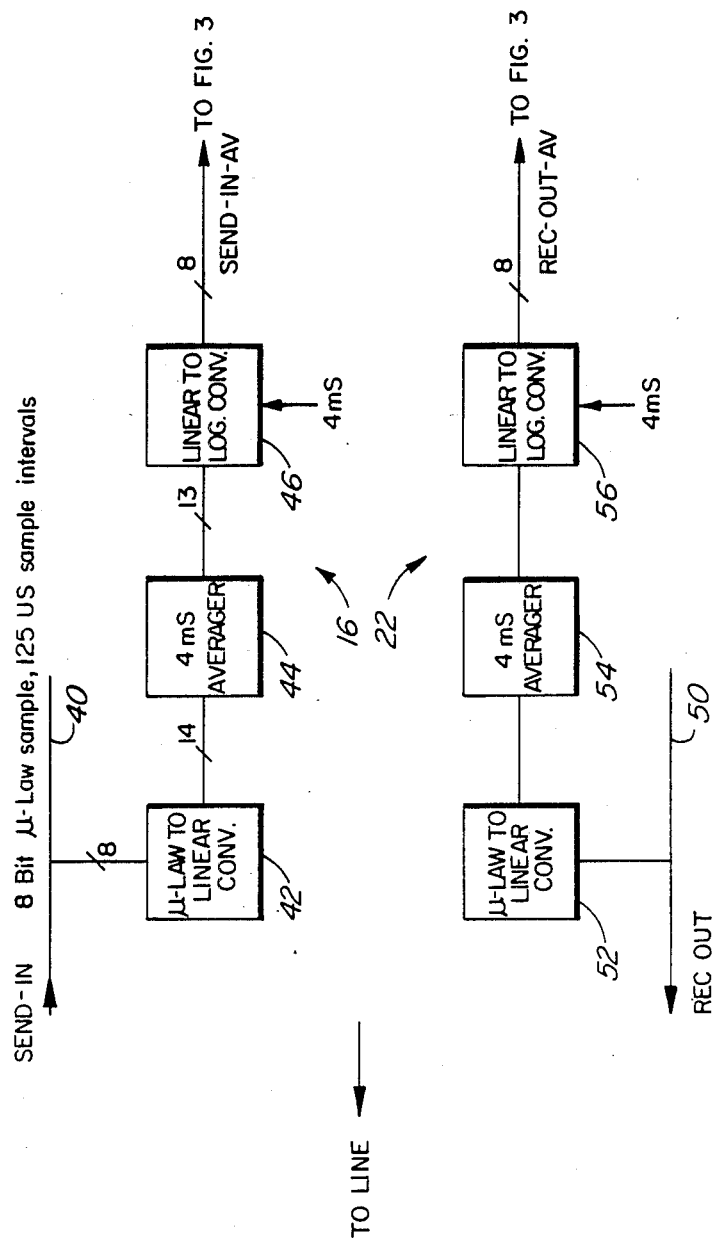
FIG. 2 is a more detailed schematic representation of level measuring circuits of the circuit of FIG. 1.

Referring first to FIG. 2, 8-bit digital bus 40 represents the connection between transmitter buffer 10 and ROM 14 of FIG. 1. Level measuring means 16 comprises μ-law to linear conversion means 42 (conveniently a ROM) which takes the 64 kB/second 8-bit μ-law PCM signal from digital bus 40, converts it to 14-bit linear PCM, and applies the linearized samples to averaging means 44.

Averaging means 44 averages the linearized PCM samples over each period of 4 milliseconds by first removing the sign bit then adding together 32 successive linearized samples. Every 4 milliseconds this sum is divided by thirty two and the resulting 13-bit word provided as an output to linear-to-log conversion means in the form of ROM 46. The 4 millisecond averaged value is converted therein to an 8-bit logarithmic signal SEND-IN-AV. This SEND-IN-AV signal is applied at 4 millisecond intervals to the microprocessor 18 and used in a manner to be described later with reference to FIGS. 3 and 4. The RECEIVE-OUT signal is processed in a similar way by level measuring means 22 (FIG. 1), which comprises a μ-law to linear converter 52 connected to digital bus 50, 4 millisecond averaging means 54, and linear-to-log conversion means 56 providing a 4 millisecond average 8-bit logarithmic signal RECEIVE-OUT-AV.

Figure 3:
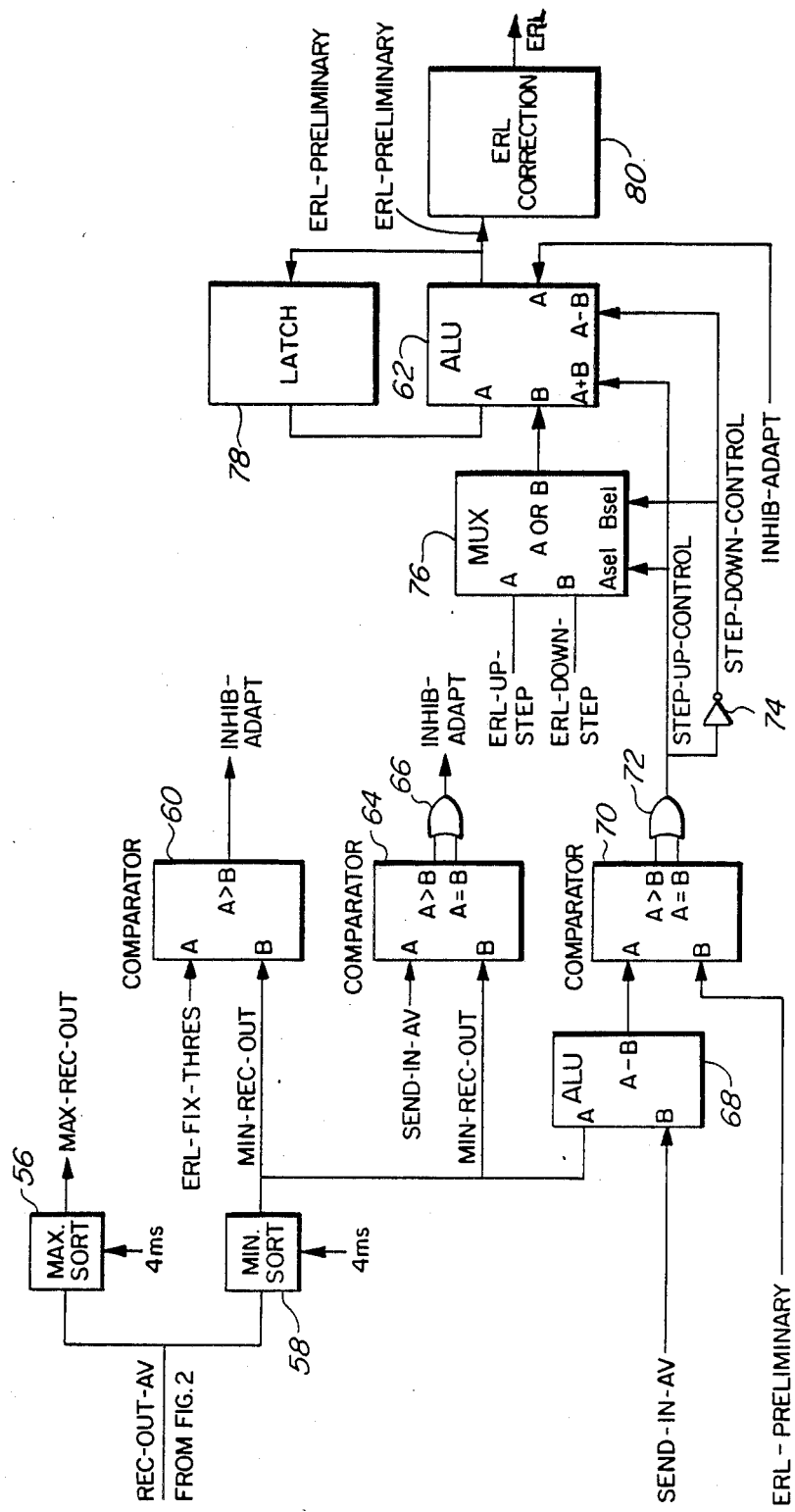
FIG. 3 is a block representation of functions performed by a microprocessor in the circuit in estimating echo return loss.
Figure 4:
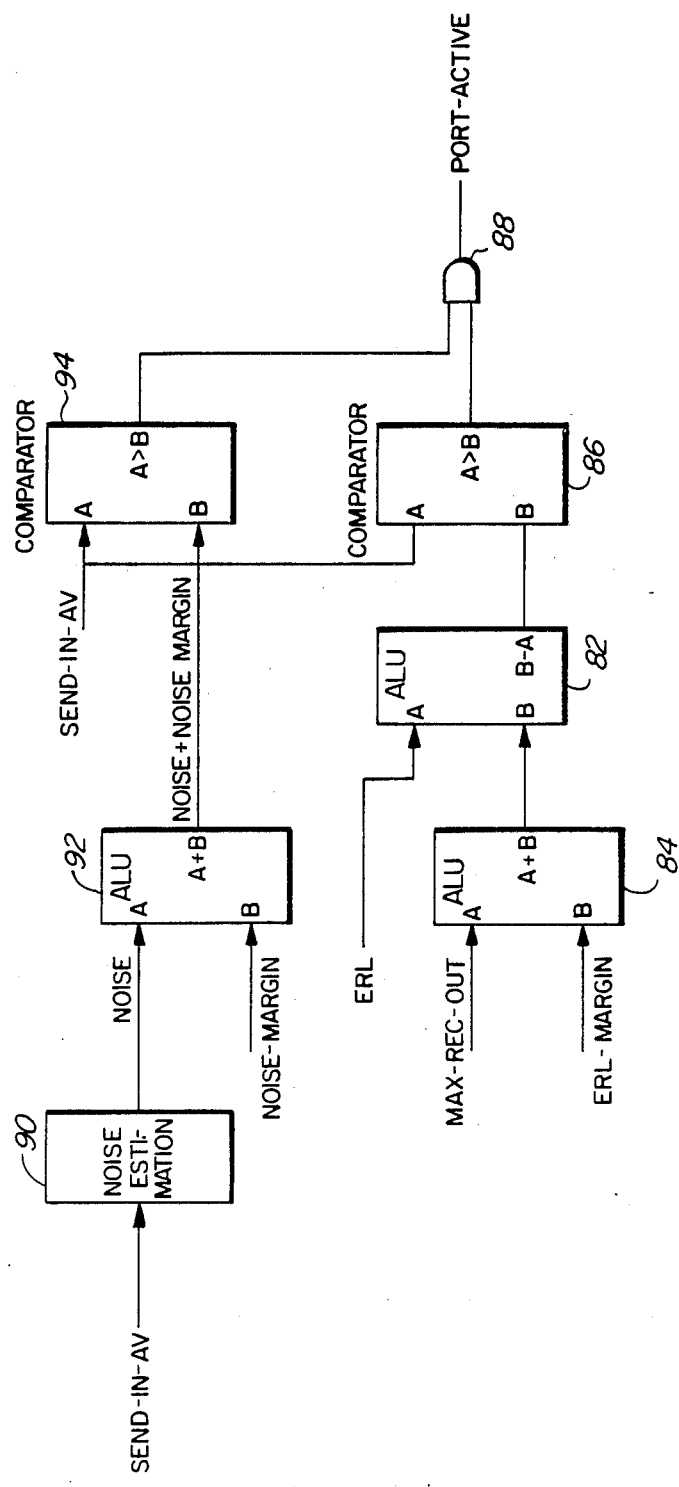
FIG. 4 is a block representation of functions performed by the microprocessor in determining, in dependence upon the echo return loss estimation, whether a port is active.

As shown in FIG. 3, the RECEIVE-OUT-AV signal is applied to maximum sorting means 56 and to minimum sorting means 58 which are actually within the microprocessor 18. The maximum and minimum sorting means 56 and 58 each store eight consecutive samples of the RECEIVE-OUT-AV signal. Every 4 milliseconds the latest sample value is compared with the eight preceding values. Maximum sorting means 56 determines from this comparison the maximum value, MAX-RECEIVE-OUT. Minimum sorting means 58 determines from the comparison the minimum value MIN-RECEIVE-OUT. The way in which the MIN-RECEIVE-OUT and MAX-RECEIVE-OUT signals are used is depicted in FIGS. 3 and 4.

FIG. 3 depicts means for providing an estimated echo return loss signal and adapting it in dependence upon the SEND-IN-AV signal and the MIN-RECEIVE-OUT signal. The MIN-RECEIVE-OUT signal is used to ensure adequate operating margins throughout the whole range of the RECEIVE-OUT signal.

Adaption of the echo return loss estimate is not done unless the MIN-RECEIVE-OUT signal is greater than a predetermined fixed threshold—for example—40 dBM. This avoids the possibility of the echo return loss estimate drifting where the MIN-RECEIVE-OUT and SEND-IN-AV signals are essentially noise. Thus, as shown in FIG. 3, the MIN-RECEIVE-OUT signal is applied to input B of a comparator 60. A fixed echo-return loss threshold value is applied to the A input and the A>B output of the comparator 60 is applied to the INHIBIT ADAPTION input A of an arithmetic logic unit 62, the function of which will be described later.

Adaption of the echo return loss signal is also inhibited if the SEND-IN-AV signal is equal to, or greater than, the MIN-RECEIVE-OUT signal. This is because the echo value should always be smaller than the transmitted signal. If it is not, the SEND-IN-AV signal cannot be the result of an echo. Consequently, the MIN-RECEIVE-OUT signal is also applied to input B of a second comparator 64. The SEND-IN-AV signal is applied to input A and the comparator's A>B and A=B outputs are applied to respective inputs of an OR gate 66. The output of OR gate 66 is applied to the INHIBIT ADAPTION input of arithmetic logic unit (ALU) 62.

The MIN-RECEIVE-OUT and SEND-IN-AV signals are also applied to inputs A and B, respectively, of an ALU 68 which, together with a comparator 70, OR gate 72 and inverter 74, serve to determine whether the echo return loss estimate should be increased or decreased. Thus, the A-B output of ALU 68 is applied to input A of comparator 70. A preliminary echo return loss signal, ERL PRELIMINARY, derived from the output of ALU 62 in a previous clock cycle, is applied to input B of comparator 70. The A>B and A-B outputs of comparator 70 are applied to respective inputs of OR gate 72. The output of OR gate 72 comprises a STEP-UP control signal which is applied directly to an A+B input of ALU 62 and to an "A-select" input of a multiplexer 76. The output of OR gate 74 is also inverted by inverter 74 to provide a STEP-DOWN control signal which is applied to the A-B input of ALU 62 and to the "B-select" input of multiplexer 76.

The multiplexer 76, ALU 62 and a latch 78, serve to generate new values of the interim echo return loss estimate ERL PRELIMINARY. The latch 78 is connected between the output and input of ALU 62 so as to apply, in each clock cycle, the previously-derived value of ERL PRELIMINARY to input A of ALU 62. The A and B inputs of multiplexer 76 are coupled to reference sources for adaption values ERL-UP-STEP and ERL-DOWN-STEP, respectively. If STEP-UP-CONTROL is set, multiplexer 76 selects ERL-UP-STEP for application to the input of ALU 62. If STEP-DOWN-CONTROL is set, multiplexer 76 selects ERL-DOWN-STEP. The actual size of each step is small so that the adaption occurs relatively slowly.

The resulting step is added to or subtracted from the previous value of ERL PRELIMINARY by ALU 62, to produce the new value. However, if the INHIBIT ADAPTION signal is set no adaption takes place and the ALU 62 maintains the previous value of ERL PRELIMINARY.

The output of ALU 62, the ERL PRELIMINARY signal, is applied to a look-up table, comprising ROM 80, which supplies the corresponding ERL estimate signal for application to the means (see FIG. 4) which determines whether or not the port is active. The look-up table compensates for the slightly pessimistic value the ERL estimation logic usually generates as well as the slightly optimistic values when ERL is close to 0 dB.

Referring now to FIG. 4, which illustrates how the ERL estimate is used in determining whether or not an individual port of the conference bridge is active, the ERL estimate signal is applied to the A input of an arithmetic logic unit 82. The B input of ALU 82 receives the A+B output of an arithmetic logic unit 84 which has the MAX-RECEIVE-OUT signal applied to one input and an ERL MARGIN signal applied to its other input. The ERL MARGIN, equal for example to 2 dB, is added to the MAX-RECEIVE-OUT signal to ensure that long term small variations of the ERL estimate will not cause a false break-in situation to occur.

The MAX-RECEIVE-OUT signal, (the maximum being used here to ensure operating margins throughout the range of RECEIVE-OUT-AV), is thus increased by the prescribed margin and the ERL estimate is subtracted from it by means of ALU 82. The resulting B-A output of ALU 82 constitutes an estimate of the echo signal at the port and is applied to the B input of a comparator 86. The SEND-IN-AV signal is applied to its A input. The A>B output of comparator 86 is supplied to one input of an AND gate 88, the output of which is a "port active" signal or "activity flag". Thus, if the SEND-IN-AV signal, which is the signal arriving at the port, is greater than the estimated echo, plus the safety margin, the decision is taken that the conferee associated with that port is actually speaking or attempting to break-in. The internal memory table of the microprocessor 18 is updated accordingly.

The other input of AND gate 88 is connected to the output of a noise level estimation means comprising noise estimator 90, arithmetic logic unit 92 and comparator 94. Noise estimator 90 takes the SEND-IN-AV signal and, using a standard or known noise measurement algorithm, slowly adapts the noise level upwards if the SEND-IN-AV signal is greater than the noise level, and quickly adapts the noise level downwards if the SEND-IN-AV signal is less than the noise level. The NOISE signal thus adapted is then increased by adding a NOISE MARGIN signal by means of ALU 92. The resulting NOISE+NOISE MARGIN signal is then compared with the SEND-IN-AV signal by comparator 94. If SEND-IN-AV is greater than NOISE+NOISE MARGIN the output of the comparator 94 to AND gate 88 is set.

Consequently, if the SEND-IN-AV signal is greater than both the NOISE+NOISE MARGIN signal as determined by comparator 94, and greater than the estimated echo signal, as determined by comparator 86, the AND gate 88 will provide a PORT ACTIVE signal. Effectively the decision that the port is active, i.e. the conferee is speaking, is made on the basis that the SEND-IN-AV signal is not merely noise, and is greater than any echo of the transmitted signal taking into account the estimated echo return loss; therefore the SEND-IN-AV signal must be speech which means the port is active.

As mentioned previously, the PORT ACTIVE signal initiates updating of its memory by the microprocessor 18 to arrange for the signal from that port to be combined for transmission to all other ports. Also, the microprocessor 18 applies gain (via memory and buffers 17 and μ-law to linear and gain insertion ROM 14) to the "active" signal samples while attenuating the signal samples from all other conferees deemed to be listeners.

It will be appreciated that various modifications of the illustrated embodiment are possible within the scope of the invention. For example, the microprocessor and latch could be arranged to combine more than two signals for common transmission to the remaining conferees.

It should be appreciated that although a TDM signal format has been specifically described by way of example, the invention can be applied to conference circuits using other signal formats.

What is claimed is:

1. A conference circuit comprising:
   (i) a conference bridge and a plurality of ports, each for connection by a respective transmission path to one of a plurality of conferees, each port being arranged to pass RECEIVE-OUT speech signals from the conference circuit to the associated conferee and to pass SEND-IN speech signals from said associated conferee to the conference circuit;
   (ii) means for combining SEND-IN speech signals from at least two of said ports and supplying the combination signal so produced to at least one of the remaining ports;
   (iii) measuring means responsive to said RECEIVE-OUT and SEND-IN signals for deriving, directly or indirectly, an echo return loss value for the particular transmission path associated with that port;
   (iv) detection means responsive to said echo return loss value and to said RECEIVE-OUT and SEND-IN signals for providing a signal indicating that the conferee associated with that port is speaking; and
   (v) control means responsive to the output of said detection means for causing said combining means to combine the SEND-IN speech signals from at least two conferees.

2. A conference circuit as defined in claim 1, wherein said measuring means comprises means responsive to a signal representing the SEND-IN signal for a port and to a signal representing the RECEIVE-OUT signal for that port, for deriving a signal representing echo return loss for the transmission path associated with that port.

3. A conference circuit as defined in claim 2, wherein said measuring means comprises means for averaging and converting to a logarithmic base, said SEND-IN signal and RECEIVE-OUT signal to produce, respectively, said signal representing the SEND-IN signal and said signal representing the RECEIVE-OUT signal.

4. A conference circuit as defined in claim 3, wherein said measuring means comprises comparator means for comparing said signal representing the SEND-IN signal with said signal representing the RECEIVE-OUT signal to provide said echo return loss value.

5. A conference circuit as defined in claim 4, wherein said measuring means comprises means for deriving over a predetermined time period a minimum value of said signal representing the RECEIVE-OUT signal, and said comparator means serves to compare such minimum value with said signal representing the SEND-IN signal.

6. A conference circuit as defined in any preceding claim, wherein said measuring means further comprises means for providing an interim value of echo return loss, means for storing interim values of echo return loss, and means for adapting instant values in dependence upon whether the difference between the signal representative of said RECEIVE-OUT signal and said signal representative of said SEND-IN signal exceeds, equals, or is less than a previous value of the interim echo return loss.

7. A conference circuit as defined in claim 6, further comprising means for inhibiting adaption of said interim echo return loss in dependence upon whether or not said minimum value of the signal representing the RECEIVE-OUT signal exceeds one or both of a fixed echo return loss threshold and the signal representing the SEND-IN signal.

8. A conference circuit as defined in claim 1, wherein said detection means comprises subtraction means for subtracting said signal representing echo return loss from said signal representing the RECEIVE-OUT signal to provide an estimated echo signal and second comparator means for comparing said estimated echo signal with said signal representing the SEND-IN signal to provide a signal indicating whether the conferee is speaking or not.

9. A conference circuit as defined in claim 8, wherein said measuring means includes means for deriving over a predetermined period of time a maximum value of said signal representing the RECEIVE-OUT signal and said subtracting means serves to subtract said echo return loss from such maximum value.

10. A circuit as defined in claim 1, wherein the port to which the combination is to be transmitted is itself active and the corresponding one of said SEND-IN signals from at least two of said ports is replaced by a dummy signal representing an idle port.

11. A method of operating a conference circuit of the kind comprising a conference bridge having a plurality of ports, each for connection by a respective transmission path to one of a plurality of conferees, each port being arranged to pass RECEIVE-OUT speech signals from the conference circuit to the associated conferee and to pass SEND-IN speech signals from said associated conferee to the conference circuit; said method comprising the steps of:
  (i) responsive to said RECEIVE-OUT and SEND-IN signals, deriving, directly or indirectly, an echo return loss value for the particular transmission path associated with that port;
  (ii) in response to said echo return loss value and to said RECEIVE-OUT and SEND-IN signals, providing a signal indicating that the conferee associated with that port is speaking; and
  (iii) responsive to said indicating signal combining SEND-IN signals from at least two of said ports and supplying the combination signal so produced to at least one of the remaining ports.

12. A method as defined in claim 11, including the step of, in response to a signal representing the SEND-IN signal for a port and a signal representing the RECEIVE-OUT signal for that port, deriving a signal representing echo return loss for the transmission path associated with that port.

13. A method as defined in claim 12, including the steps of averaging and converting to a logarithmic base said SEND-IN signal and said RECEIVE-OUT signal to produce, respectively, said signal representing the SEND-IN signal and said signal representing the RECEIVE-OUT signal.

14. A method as defined in claim 13, including the step of comparing said signal representing the SEND-IN signal with said signal representing the RECEIVE-OUT signal to provide said echo return loss value.

15. A method as defined in claim 14, including the step of deriving over a predetermined time period a minimum value of said signal representing the RECEIVE-OUT signal, and said comparing step comprises comparing such minimum value with said signal representing the SEND-IN signal.

16. A method as defined in claim 15, including the step of providing an interim value of echo return loss and adapting such value in dependence upon whether the difference between said signal representing the RECEIVE-OUT signal and said signal representing the SEND-IN signal exceeds, equals, or is less than a previous value of the interim echo return loss.

17. A method as defined in claim 16, including the step of inhibiting adaption of said interim echo return loss in dependence upon whether or not said minimum value of the signal representing the RECEIVE-OUT signal exceeds one or both of a fixed echo return loss threshold and the signal representing the SEND-IN signal.

18. A method as defined in claim 11, including the steps of subtracting said signal representing echo return loss from said signal representing the RECEIVE-OUT signal to provide an estimated echo signal and comparing said estimated echo signal with said signal representing the SEND-IN signal to provide said signal indicating whether the associated conferee is speaking.

19. A method as defined in claim 18, including the step of deriving over a predetermined period of time a maximum value of said signal representing the RECEIVE-OUT signal and subtracting said echo return loss from such maximum value.

20. A method as defined in claim 11 wherein the port to which the combination signal is to be sent is an active port and the corresponding one of said SEND-IN signals from at least two of said ports is replaced by a dummy signal representing an idle port.

* * * * *